US012596945B2

(12) United States Patent
Beale et al.

(10) Patent No.: US 12,596,945 B2
(45) Date of Patent: Apr. 7, 2026

(54) METHOD AND SYSTEM FOR COMPILING BARE QUANTUM-LOGIC CIRCUITS

(71) Applicant: Keysight Technologies, Inc., Santa Rosa, CA (US)

(72) Inventors: Stefanie J. Beale, Kitchener (CA); Joel J. Wallman, Kitchener (CA)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 690 days.

(21) Appl. No.: 17/992,580

(22) Filed: Nov. 22, 2022

(65) Prior Publication Data

US 2024/0169229 A1     May 23, 2024

(51) Int. Cl.
*G06N 10/20* (2022.01)
*G06N 10/70* (2022.01)

(52) U.S. Cl.
CPC ............. *G06N 10/20* (2022.01); *G06N 10/70* (2022.01)

(58) Field of Classification Search
CPC ................................ G06N 10/20; G06N 10/70
USPC .......................................................... 716/107
See application file for complete search history.

(56) References Cited

U.S. PATENT DOCUMENTS

| | | | | |
|---|---|---|---|---|
| 2017/0308803 | A1* | 10/2017 | Wallman | G06F 11/004 |
| 2020/0118026 | A1* | 4/2020 | Ashrafi | G02F 3/00 |
| 2021/0374588 | A1 | 12/2021 | Gidney et al. | |
| 2022/0029625 | A1* | 1/2022 | Gidney | G06F 11/004 |
| 2024/0354630 | A1* | 10/2024 | Lee | G06N 10/40 |

OTHER PUBLICATIONS

Thomas R. Scruby et al., "Non-Pauli Errors in the Three-Dimensional Surface Code", Quantum Physics, Phys. Rev. Research, Jun. 8, 2022, pp. 1-25.
Shiro Kawabata, "Quantum Interleaver: Quantum Error Correction for Burst Error," Quantum Physics, J. Phys. Soc. Jpn., Dec. 27, 2000, pp. 1-6.
Stefanie J. Beale et al., "Quantum error correction decoheres noise", Quantum Physics, Phys. Rev. Lett., Nov. 6, 2018, pp. 1-7.
Joel J. Wallman et al., "Noise tailoring for scalable quantum computation via randomized compiling," Quantum Physics, Phys. Rev. A, Jun. 9, 2016, pp. 1-10.

* cited by examiner

*Primary Examiner* — Suchin Parihar

(57)     ABSTRACT

A system and method are provided for compiling a bare quantum-logic circuit. The method includes receiving the bare quantum-logic circuit including multiple encoded operations and multiple syndrome measurements, where each encoded operation and each syndrome measurement may be associated with an input and/or output quantum error correction code; interleaving multiple random stabilizers and/or multiple random stabilizers associated with multiple random operations between adjacent encoded operations, between adjacent syndrome measurements, and/or between adjacent encoded operations and syndrome measurements, respectively, to provide one or more modified quantum-logic circuits logically equivalent to the bare quantum-logic circuit; and outputting the one or more modified quantum-logic circuits to a quantum information processor or a simulator of quantum information processor for execution, where when executed, the one or more modified quantum-logic circuits enable a noise-tailored outcome, having reduced coherent and non-unital logical noise.

20 Claims, 5 Drawing Sheets

311 315

321 328

METHOD AND SYSTEM FOR COMPILING BARE QUANTUM-LOGIC CIRCUITS

BACKGROUND

Quantum computers perform computations based on quantum mechanics. The complexity of quantum states and processes in quantum computation allows for more complex errors than are present in classical computation. Such errors include coherent (unitary) and non-unital errors, which are a persistent problem for quantum computers. As such, several techniques have been developed to offset the impact of coherent errors and non-unital errors, including quantum error correction (QEC), for example. These techniques, while valuable, are imperfect and generally leave some residual coherent and non-unital errors.

QEC, in particular, is expected to be an integral part of any long-term implementation of a quantum computer. QEC causes the noise in the quantum computer to decohere, meaning that noise at the logical level is less coherent than noise at the physical level, which induces the noise at the logical level. However, some amount of logical coherent and non-unital noise may remain following QEC. Coherent and non-unital noise is difficult to handle and may interfere and cause errors to build up. Noise that is entirely described by a stochastic Weyl channel is therefore preferred to noise that is even partly coherent or non-unital.

Further, coherent and non-unital errors map portions of a state outside of the space typically considered when applying corrections. Ideal syndrome measurement (which is a vital step of QEC) projects the encoded state back onto the subspaces of the physical space typically studied in QEC. However, in practice, syndrome extraction circuits are slow and generally introduce more noise than Weyl operations. That is, the projection applied by syndrome measurements is not ideal and therefore may leave a portion of the encoded state outside of the desired subspace.

When error correction is not in use, a technique called randomized compiling (RC) is often applied to remove the coherent and non-unital part of the physical noise. RC may also be combined with QEC. RC at the physical level results in a stochastic Weyl physical noise channel that induces stochastic Weyl logical noise when QEC is applied. However, RC may not be possible in QEC gadgets where the physical circuit contains non-Clifford gates. Further, optimal implementation of a gadget that minimizes noise may preclude the use of RC. For example, for a gadget containing a qudit that idles for a long time, the implementation that minimizes noise will not generally have random gates inserted in every time step.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
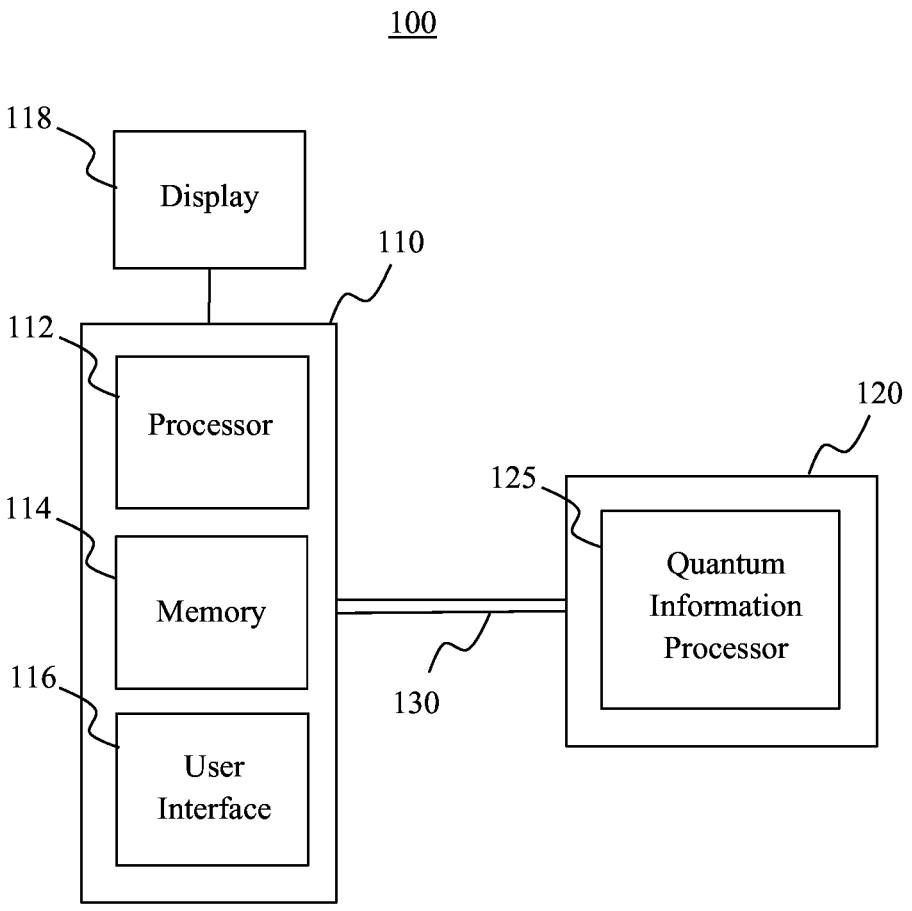
FIG. 1 is a simplified block diagram showing a quantum computer system, including a compiler and a quantum device, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The term "qudit" refers to a unit of quantum information, and is understood to include the special case of "qubits," which are qudits with dimension two. For qubit systems, the terms Weyl and Pauli may be used interchangeably. All uses of Weyl may therefore be understood to include Pauli operations when the qudits are 2-dimensional.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Any quantum computation may be written as a sequence of three types of primitive operations at the physical level, namely state resets, unitary operations, and measurements. In the context of quantum error correction, the three types of primitive operations are encoded at the logical level, namely encoded state resets, encoded unitary operations, and encoded measurements, and an additional logical primitive is added, called syndrome measurements. Each of these four logical primitives includes at least one of the three types of physical primitive operations. The term "encoded" is provided to distinguish between physical implementations of primitives, and operations in a quantum error correction (QEC) and/or fault-tolerant (FT) implementation of a quantum computation. This nomenclature arises because a QEC implementation "encodes" each of the primitive operations, so that they act on a larger physical space than the bare computation would in such a way that errors may be detected by performing syndrome measurements (which return an error syndrome). The returned error syndrome may be used to correct errors by applying appropriate recovery operations. The errors that occur are not uniquely determined by the error syndrome, so selecting the appropriate recovery operation for a given error syndrome is crucial to maximize performance of a given code relative to the errors in the implementation. This nomenclature does not imply that the quantum error correcting code (QECC) used to encode each operation is fixed. Rather, any references to "the" input QECC, output QECC, or properties thereof in the context of an operation should be interpreted to refer to a QECC that determines how an operation is encoded at the time that the operation is to be performed.

Typically, recovery operations are selected assuming that the errors in the implementation are stochastic Weyl errors, as discussed above. Stochastic Weyl errors have the crucial property that the state of the system can always be assumed to be in a definite (although unknown) error syndrome. In comparison, coherent and non-unital errors (including, for example, single-qubit phase rotation errors) generically map the state of the system into superpositions of error syndrome states. These superpositions may interfere with one another and accumulate, causing the coherent and non-unital errors to accumulate and create different and more severe noise than the initial errors. Consequently, recovery operators for coherent and non-unital errors should be chosen differently than for stochastic Weyl errors. However, selecting such recovery operators is substantially more complex as one must optimize the action on a larger Hilbert space, and an imperfect correction may result in significantly larger errors.

According to various embodiments, Logical Randomized Compiling (LRC) is implemented to reduce logical errors (e.g., generic Markovian noise), including coherent noise, bringing it closer to stochastic Weyl noise, which is typically considered in quantum error correction (QEC). LRC removes some coherent or non-unital portion of the noise that may otherwise remain after QEC, despite the effects of error correction. Therefore, applying LRC to encoded operations and syndrome measurements subjected to QEC results in improved performance over QEC alone because it removes a portion of the coherent and non-unital noise otherwise missed by QEC. This makes the effects of the noise easier to analyze and improves performance of standard decoders designed for stochastic Weyl errors. Any use of the term QEC refers to fault tolerant or non-fault tolerant implementations.

Random stabilizers introduced by LRC are better than stabilizer measurements for projecting onto the space typically considered in QEC because they are less noisy, and generally preserve the circuit depth. Even in the case where it is not possible to compile the random stabilizers into neighboring gates, they are still significantly faster to implement than syndrome extraction circuits, which include physical measurements.

Although it is possible to combine RC with QEC, it is not always possible to apply RC under optimal gadget implementations. Also, LRC can account for errors introduced during syndrome extraction which would be missed by RC. LRC also introduces less overhead than RC when each is applied to QEC circuits.

According to a representative embodiment, a method is provided for compiling a bare quantum-logic circuit. The method includes receiving a bare quantum-logic circuit including multiple encoded operations and multiple syndrome measurements, where each encoded operation and each syndrome measurement is associated with an input quantum error correction code (QECC) and/or an output QECC; interleaving multiple random stabilizers and/or multiple random stabilizers paired with multiple random operations between adjacent encoded operations, between adjacent syndrome measurements, and/or between adjacent encoded operations and syndrome measurements, respectively, to provide one or more modified quantum-logic circuits that are logically equivalent to the bare quantum-logic circuit; and outputting the one or more modified quantum-logic circuits to a quantum information processor or a simulator of quantum information processor for execution. When executed, the one or more modified quantum-logic circuits result in a noise-tailored outcome, having reduced coherent and non-unital logical noise.

According to a representative embodiment, a system includes a quantum information processor, and one or more data processors. The one or more data processors are configured to perform operations including receiving a bare quantum-logic circuit including multiple encoded operations and multiple syndrome measurements, where each encoded operation and each syndrome measurement is associated with an input QECC and/or an output QECC; applying multiple random stabilizers and/or multiple random stabilizers paired with multiple random operations between adjacent encoded operations, between adjacent syndrome measurements, and/or between adjacent encoded operations and syndrome measurements, respectively, to provide one or more modified quantum-logic circuits that are logically equivalent to the bare quantum-logic circuit; and output the one or more modified quantum-logic circuits. The quantum information processor is configured to receive and execute the one or more modified quantum-logic circuits output by the one or more data processors to obtain a noise-tailored outcome having reduced coherent and non-unital logical noise.

According to a representative embodiment, a method is provided for tailoring noise in quantum computations. The method includes receiving a bare quantum-logic circuit including multiple encoded operations and multiple syndrome measurements, where each encoded operation and each syndrome measurement is associated with an input QECC and/or an output QECC; generating, by operation of a data processor, one or more modified quantum-logic circuits that are logically equivalent to the bare quantum-logic circuit, where generating the one or more modified quantum-logic circuits includes interleaving multiple random stabilizers and/or multiple random stabilizers paired with multiple random operations between adjacent encoded operations of the plurality of encoded operations, between adjacent syndrome measurements of the plurality of syndrome measurements, and/or between adjacent encoded operations and syndrome measurements, respectively; executing the one or more modified quantum-logic circuits on a quantum information processor or a simulator of a quantum information processor to obtain multiple outcomes; and averaging the outcomes to obtain a noise-tailored outcome.

FIG. 1 is a simplified block diagram showing a quantum computer system, including a compiler and a quantum device, according to a representative embodiment.

Referring to FIG. 1, quantum computer system 100 includes compiler 110, quantum device 120, and system interface 130 configured to enable communications between the compiler 110 and the quantum device 120. The compiler 110 includes one or more processors and memories, indicated by representative processor 112 and memory 114, respectively. The compiler 110 may also include a display 118 and a user interface 116 to enable user interaction. The compiler 110 may be implemented as a computer system, such as a laptop computer, a desktop computer, a computer workstation, a server, a server cluster, or a mainframe, for example. The quantum device 120 includes a quantum information processor 125.

The processor 112 of the compiler 110 is representative of one or more processing devices, and is configured to execute software instructions to perform functions as described in the various embodiments herein. The processor 112 may be implemented by a central processing unit, one or more processors, microprocessors or microcontrollers, a state machine, a programmable logic device, field programmable gate arrays (FPGAs), application specific integrated circuits (ASICs), or combinations thereof, using any combination of hardware, software, firmware, hard-wired logic circuits, or combinations thereof. The processor 112 also may include one or more chips or chipsets that include analog circuitry, digital circuitry or combinations thereof.

The term "processor," in particular, encompasses an electronic component able to execute a program or machine executable instructions. References to "a processor" should be interpreted to include more than one processor or processing core, as in a multi-core processor, and/or parallel processors. A processor may also refer to a collection of processors within a single computer system or distributed among multiple computer systems, such as in a cloud-based or other multi-site application. Programs have software instructions performed by one or multiple processors that may be within the same computing device or which may be distributed across multiple computing devices.

The memory 114 may include a main memory and/or a static memory, where such memories may communicate with each other and the processor 112 via one or more buses. The memory 114 stores instructions used to implement some or all aspects of methods and processes described herein, including the methods described herein with reference to FIG. 3, for example. The memory 114 may also store application data and data objects that may be interpreted by one or more applications or virtual machines running on the processor 112. In some cases, the memory 114 stores computer-readable instructions for software applications, scripts, programs, functions, executables or other modules that are executable by the processor 112.

The memory 114 may be implemented by any number, type and combination of random access memory (RAM) and read-only memory (ROM), for example, and may store various types of information, such as software algorithms, data based models, and computer programs, all of which are executable by the processor 112. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, blu-ray disk, a universal serial bus (USB) drive, or any other form of storage medium known in the art.

The memory 114 is a tangible storage medium for storing data and executable software instructions, and is non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 114 may store software instructions and/or computer readable code that enable performance of various functions. The memory 114 may be secure and/or encrypted, or unsecure and/or unencrypted.

Also, the memory 114 stores quantum-logic source code to be executed by the quantum information processor 125 in the quantum device 120. For example, quantum-logic source code may be stored in the memory 114 as quantum-logic gate sequences, quantum-logic circuits, quantum algorithms or other representations of quantum-logic. The processor 112 may convert the quantum-logic source code into machine code that can be executed by the quantum device 120. For example, the machine code may be stored as a pulse sequence (e.g., radio frequency, microwave frequency, optical frequency), a pulse program, or other type of control sequence configured for execution by the quantum device 120. The machine code also may be stored on the memory 114 of the compiler 110, and transferred to the quantum device 120 via the system interface 130.

The user interface 116 is configured to provide information and data output by the processor 112 and/or the memory 114 to the user and/or for receiving information and data input by the user. That is, the user interface 116 enables the user to enter data and to control or manipulate aspects of the processes described herein, and also enables the processor 112 to indicate the effects of the user's control or manipulation. The user interface 116 may connect one or more user interfaces, such as a mouse, a keyboard, a trackball, a joystick, a haptic device, a microphone, a video camera, a touchpad, a touchscreen, voice or gesture recognition captured by a microphone or video camera, for example, or any other peripheral or control to permit user feedback from and interaction with the compiler 110. The user interface 116 may further include one or more of ports, disk drives, wireless antennas, or other types of receiver circuitry.

The display 118 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 118, in combination with the user interface 116, may also provide a graphical user interface (GUI) for displaying and receiving information to and from the user.

The quantum device 120 may be a universal quantum computer, a quantum sensor, or a quantum repeater, for example. A universal quantum computer, for example, can operate in a fault-tolerant, error corrected, and/or unencoded regime and may be programmed and re-programmed to perform computations. A quantum repeater, for example, can perform quantum error correction in an optical network used for a quantum key distribution scheme. A quantum sensor may measure physical properties of an external system based on quantum interactions or phenomena. In an embodiment, a simulator programmed to simulate operation of the quantum information processor 125 may be used in place of the quantum device 120. The simulator is a (usually classical) device that receives an input program and sometimes specifications of a quantum information processor, and returns an approximation of the results that could be returned had the input program been run on the input quantum information processor or a quantum information processor which the simulator is designed to approximate, as would be apparent to one skilled in the art.

The quantum information processor 125 of the quantum device 120 may include hardware, software, firmware, or combinations thereof configured to process quantum information. The quantum information processor 125 may be implemented using any suitable computing architecture or physical modality for quantum computing, such as a trapped ion system, a superconducting quantum interference device (SQUID)-based system, a spin-based system, or an optical system, for example, as would be apparent to one skilled in the art. The quantum information processor 125 may be programmed to realize one or more quantum-logic circuits.

The quantum information processor 125 stores quantum information in a Hilbert space defined by a quantum system. The Hilbert space is a theoretical descriptor of the space that stores a state on a physical quantum system. The quantum system comprises a physical qudit or a set of physical qudits contained in the quantum information processor 125, and performs quantum computing operations that manipulate the quantum information in the Hilbert space. The quantum information processor 125 may store any suitable number (n) of qudits, and the Hilbert space may be any suitable size (for example, for a set of n qudits with uniform dimension (d), the Hilbert space would be $d^n$-dimensional). The quantum information processor 125 may coherently control the quantum system and preserve relative phases of the qudits. When the quantum information processor 125 is a universal quantum computer, it may create any coherent state in the Hilbert space. The quantum information processor 125 may be configured to measure the state of the quantum system, or a subsystem thereof, in a suitable basis. For example, the quantum information processor 125 may be configured to measure one or more of the qudits in a computational basis.

The system interface 130 may be any compatible interface capable of communicating data and instructions between the compiler 110 and the quantum device 120, as would be apparent to one skilled in the art. For example, the system interface 130 may include one or more wired or wireless connections, networks or other communication channels, such as a local area network (LAN), a wide area network (WAN), a private network, a virtual private network (VPN), a public network (e.g., the Internet), a peer-to-peer network, a cellular network, a Wi-Fi network, or a personal area network (PAN), for example. The system interface 130 may include a wired communication interface, such as USB, Ethernet, coaxial, optical, that may be connected directly or indirectly between the compiler 110 and the quantum device 120, for example.

Generally, the compiler 110 obtains quantum-logic source code (e.g., quantum-logic gate sequences, quantum-logic circuits, quantum algorithms), modifies the quantum-logic source code during the compilation process, and provides the modified quantum-logic source code to the quantum information processor 125 for execution. The quantum-logic source code may include bare quantum-logic circuits, including encoded operations and syndrome measurements. The compiler 110 may receive the quantum-logic source code from the memory 114 and/or the user interface 116. The processor 112 may modify the quantum-logic source code to reduce the effects of noise in the quantum device 120. FIGS. 3A to 3D show examples of how primitive elements of bare quantum-logic circuits of the quantum-logic source code may be modified to tailor noise in the quantum device 120 by reducing coherent and non-unital noise to bring it closer to stochastic Weyl noise, as discussed below.

The compiler 110 may compile portions (e.g., one or more clock cycles) of the quantum-logic source code "on-the-fly," while the quantum device 120 executes earlier-compiled portions (e.g., earlier clock cycles) of the quantum-logic source code. In alternative configurations, the compiler may provide each cycle of modified quantum-logic source code to the quantum device 120 individually, or all cycles of the modified quantum-logic source code may be provided to the quantum device 120 together. For example, the compiler 110 may pre-compile all of the quantum-logic source code before the quantum information processor 125 begins execution.

As discussed above, the quantum information processor 125 is subjected to noise that may create errors. The noise may include, for example, coherent noise processes and/or incoherent noise processes. According to various embodiments, the compiler 110 modifies the quantum-logic source code to tailor the noise affecting the quantum information processor 125 by reducing the coherent/non-unital effects of noise and bringing the noise processes closer to stochastic Weyl noise.

Figure 2:
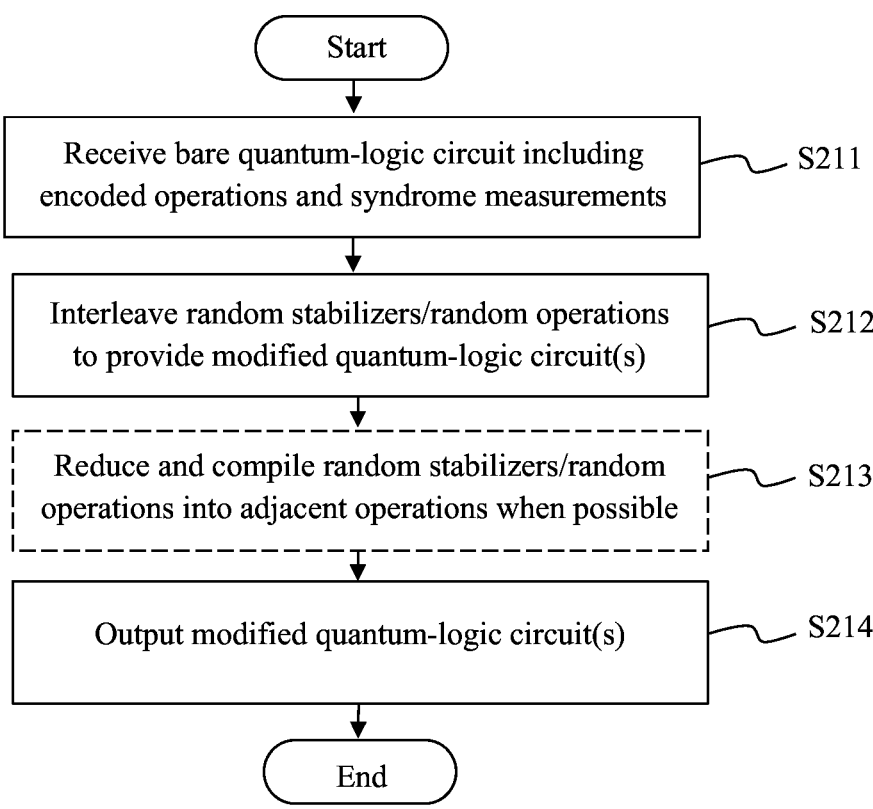
FIG. 2 is a flow diagram showing a method of compiling a bare quantum-logic circuit to tailor errors, according to a representative embodiment.

FIG. 2 is a flow diagram showing a method of compiling a bare quantum-logic circuit to tailor errors, according to a representative embodiment, which may be referred to as Logical Randomized Compiling (LRC). The method may be implemented by instructions stored in memory (e.g., memory 114) and executed by one or more processors (e.g., processor 112).

Referring to FIG. 2, a bare quantum-logic circuit is received in block S211. The bare quantum-logic circuit may be received from a user interface (e.g., user interface 116), for example. The bare quantum-logic circuit includes multiple encoded operations and multiple syndrome measurements, where each encoded operation and each syndrome measurement may be associated with an input quantum error correction code (QECC) at the input of the encoded operation or syndrome measurement and/or an output QECC at the output of the encoded operation or syndrome measurement. The input and/or output QECCs are used for encoding the operations (primitive elements) and designing the syndrome measurements of the bare quantum-logic circuit, as would be apparent to one skilled in the art. The encoded operations and syndrome measurements may be associated with the same or different input and/or output QECCs, without departing from the scope of the present teachings. The QECCs also may have been received from a user interface. An encoded operation or syndrome measurement consists of physical implementations of the three primitive operations of a quantum information processor, i.e., state reset, unitary operations, and measurements, applied in such a way that the (ideal) effect on the encoded space is to apply the encoded operation or to project onto a space corresponding to the outcome of the syndrome measurement.

In block S212, random stabilizers and/or random stabilizers paired with random operations are interleaved between adjacent encoded operations and/or syndrome measurements to provide one or more modified quantum-logic circuits that are logically equivalent to the bare quantum-logic circuit that was initially received. Random stabilizers appearing before encoded operations or syndrome measurements are drawn from the stabilizer group of the input QECC associated with the following encoded operations and/or syndrome measurements, and random stabilizers appearing after encoded operations or syndrome measurements are drawn from the stabilizer group of the output QECC associated with the preceding encoded operations and/or syndrome measurements. Each QECC has a corresponding single, fixed stabilizer group, as would be apparent to one skilled in the art. Random operations are drawn from a group of logical operations selected according to the neighboring encoded operations to tailor noise introduced by such encoded operations, and the random operations are encoded based on the QECC associated therewith. That is, the random stabilizers and/or the random stabilizers paired with the random operations may be interleaved between two adjacent encoded operations, between two adjacent syndrome measurements, and/or between an encoded operation and an adjacent syndrome measurement. In some cases, the group of logical operations that random operations are drawn from is a trivial group, meaning that no logical operation is applied. In this case, applying a random stabilizer paired with a random operation selected from the trivial group is the functional equivalent of applying only the random stabilizer by itself since the random operation does nothing. A portion of the random operations may be configured to invert one or more of the random operations interleaved between other encoded operations and/or syndrome measurements.

FIGS. 3A to 3D are simplified schematic diagrams showing random stabilizers and/or random stabilizers paired with random operations interleaved between adjacent encoded operations and/or syndrome measurements, according to representative embodiments. Although each of FIGS. 3A to 3D shows only one encoded operation or one syndrome measurement, it is understood that the encoded operation or syndrome measurement is representative of a single step of an interleaving operation involving multiple additional steps in which random stabilizers are interleaved between other encoded operations and/or syndrome measurements as well. Further, the term "interleaving" is used to indicate that the random stabilizers and/or random stabilizers paired with random operations are provided between adjacent encoded operations and/or syndrome measurements, even though only one representative encoded operations or syndrome measurement is shown.

Figure 3A:
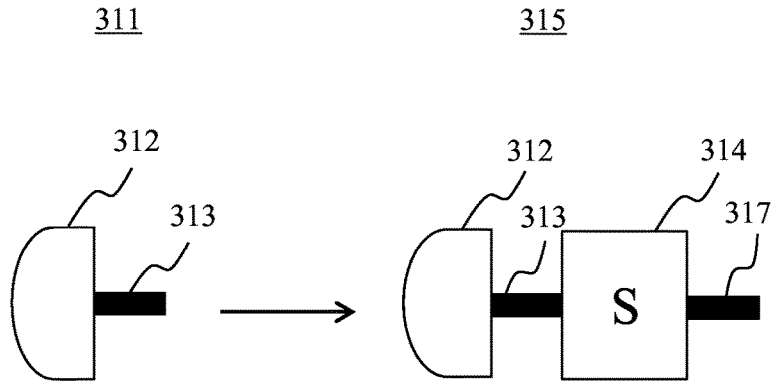
FIG. 3A is a simplified schematic diagram showing interleaving a random stabilizer with an encoded state reset operation, according to a representative embodiment.

FIG. 3A shows interleaving a random stabilizer with an encoded state reset operation, according to a representative embodiment. The effect of the interleaving includes the insertion of a random stabilizer of the output QECC associated with the state reset operation.

In particular, bare quantum-logic circuit 311 includes encoded state reset 312, which has a quantum state output 313. Further to the compilation process of FIG. 2, indicated by the horizontal arrow, a random stabilizer (S) 314 is applied to the quantum state output 313 after the state reset 312 to provide modified quantum-logic circuit 315, which has quantum state output 317. The random stabilizer 314 may be drawn from the stabilizer group of a QECC associated with the encoded state reset 312. In the depicted example, it may be assumed that the random stabilizer 314 is paired with a random operation selected from a trivial group, so no logical operation is applied. The input QECCs (and output QECCs) are provided as input and fundamentally have already been set because encoded operations are received as input rather than physical circuits. In other words, all of the input is already at the logical level. The group of stabilizers is a fundamental feature of each QECC and is in principle the same for different types of operations, although the stabilizer groups are different for different QECCs.

Figure 3B:
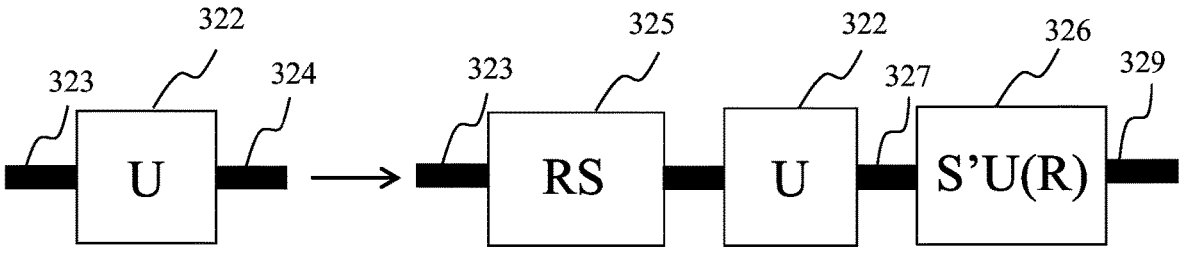
FIG. 3B is a simplified schematic diagram showing interleaving random stabilizers paired with random operations with an encoded unitary operation, according to a representative embodiment.

FIG. 3B shows interleaving random stabilizers paired with respective random operations with an encoded operation comprising an encoded unitary operation, according to a representative embodiment. In particular, bare quantum-logic circuit 321 includes encoded unitary operation (U) 322, which has a quantum state input 323 and a quantum state output 324. Further to the compilation process, indicated by the horizontal arrow, a first random logical operation (R) is paired with (e.g., preceded by) a first random stabilizer (S) in block 325, which is applied to the quantum state input 323 before the unitary operation (U) 322. The first random logical operation provides an interim operation (U(R)). A second random stabilizer (S') paired with (e.g., preceded by) the interim operation (U(R)) in block 326 is applied to the quantum state output 327 after the unitary operation (U) 322 to provide modified quantum-logic circuit 328, which has quantum state output 329. The second random operation (U(R)) in block 326 corresponds to the ideal implementation of the desired unitary operation (U) acting on the first random operation (R). The first random stabilizer (S) is drawn from the input QECC associated with the encoded unitary operation (U) and the second random stabilizer (S') is drawn from the stabilizer group of the output QECC associated with the encoded unitary operation (U).

Figure 3C:
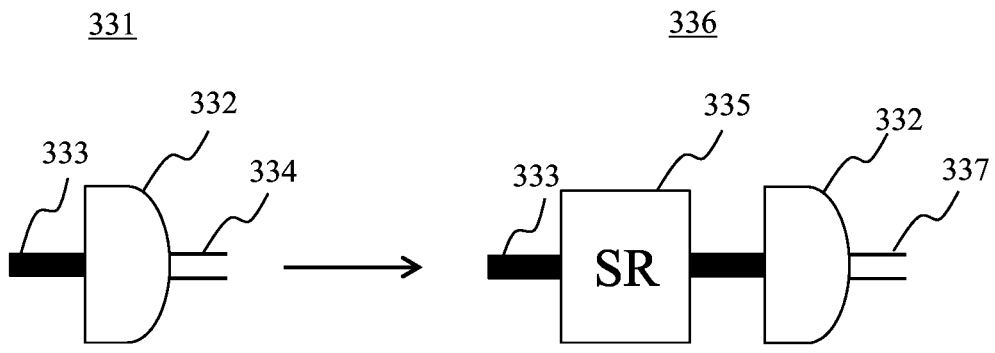
FIG. 3C is a simplified schematic diagram showing interleaving a random stabilizer paired with a random operation with a logical measurement, according to a representative embodiment.

FIG. 3C shows interleaving a random stabilizer paired with a random operation with an encoded measurement, according to a representative embodiment. In particular, bare quantum-logic circuit 331 includes an encoded measurement 332, which has a quantum state input 333 and a classical output 334. Further to the compilation process, indicated by the horizontal arrow, a random stabilizer (S) paired with (e.g., preceded by) a random operation (R) in block 335 is applied to the quantum state input 333 before the measurement 332 to provide modified quantum-logic circuit 336, which has classical output 337. The classical output 337 can be updated to account for the random operation (R). The random stabilizer (S) is drawn from the stabilizer group of the input QECC associated with the encoded measurement.

Figure 3D:
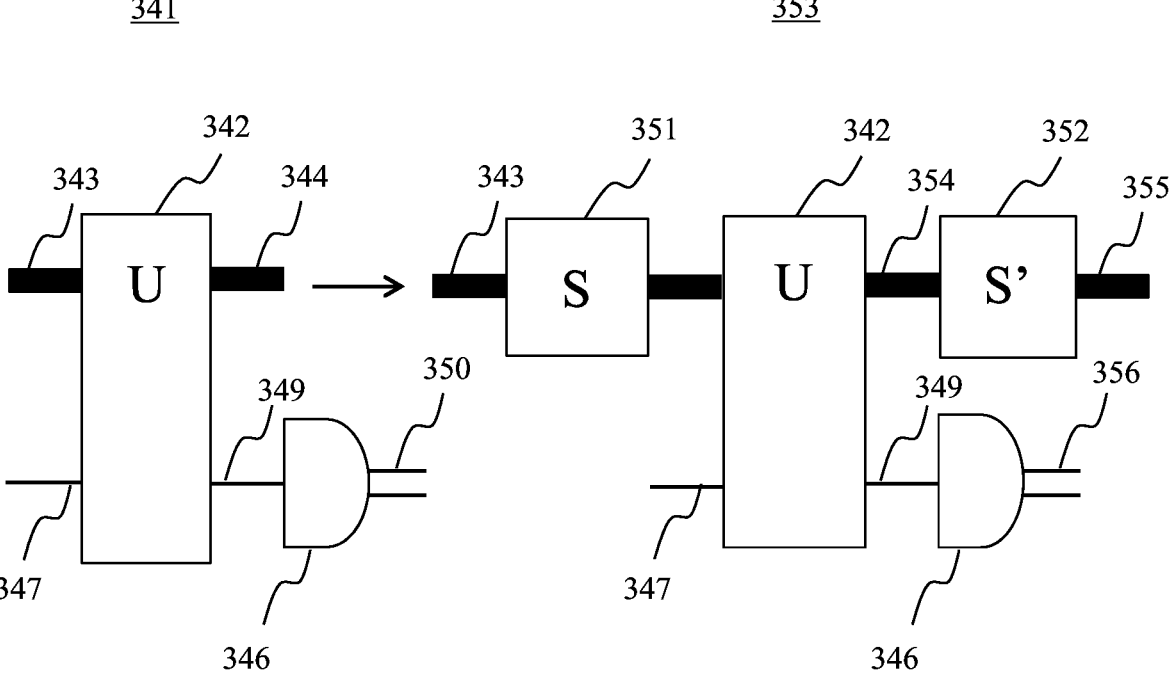
FIG. 3D is a simplified schematic diagram showing interleaving random stabilizers with a syndrome measurement operation, according to a representative embodiment.

FIG. 3D shows interleaving random stabilizers with a syndrome measurement operation, according to a representative embodiment. In particular, bare quantum-logic circuit 341 comprises a syndrome measurement that includes a unitary operation on the joint space formed by the encoded space and readout qudits used to facilitate the extraction of error syndromes. A quantum unitary operation (U) 342 has an input composed of an encoded quantum state (input 343) and a state on the readout qudits (input 347). The output of the unitary operation (U) 342 is a joint state on the encoded space (quantum state output 344) and the space of the readout qudits (quantum output 349). The unitary operation (U) is followed by a measurement 346 of the readout qudits resulting in a classical output 350. Further to the compilation process, indicated by the horizontal arrow, a first random stabilizer (S) 351 is applied to the quantum state input 343 before the quantum unitary operation 342, and a second random stabilizer (S') 352 is applied to the quantum state output 354 after the quantum unitary operation 342, to provide modified quantum-logic circuit 353, which has quantum state output 355. The modified quantum-logic circuit 353 also has classical output 356 from the measurement 346. In the depicted example, it may be assumed that the first and second random stabilizers 351 and 352 are paired with random operations selected from a trivial group, so no logical operations are applied, respectively.

Stated differently, interleaving random stabilizers with a syndrome measurement includes applying a random stabilizer, drawn from the stabilizer group of the input QECC associated with the syndrome measurement, before measuring at least one dit (e.g., higher dimensional version of a bit) during the syndrome measurement, and/or applying another random stabilizer, drawn from the stabilizer group of the output QECC associated with the syndrome measurement, after measuring the at least one dit during the syndrome measurement. Depending on the selection of the unitary operation (U) and the size of the readout qudit space, FIG. 3D may represent the measurement of one or more syndrome dits.

Figures 4A, 4B:
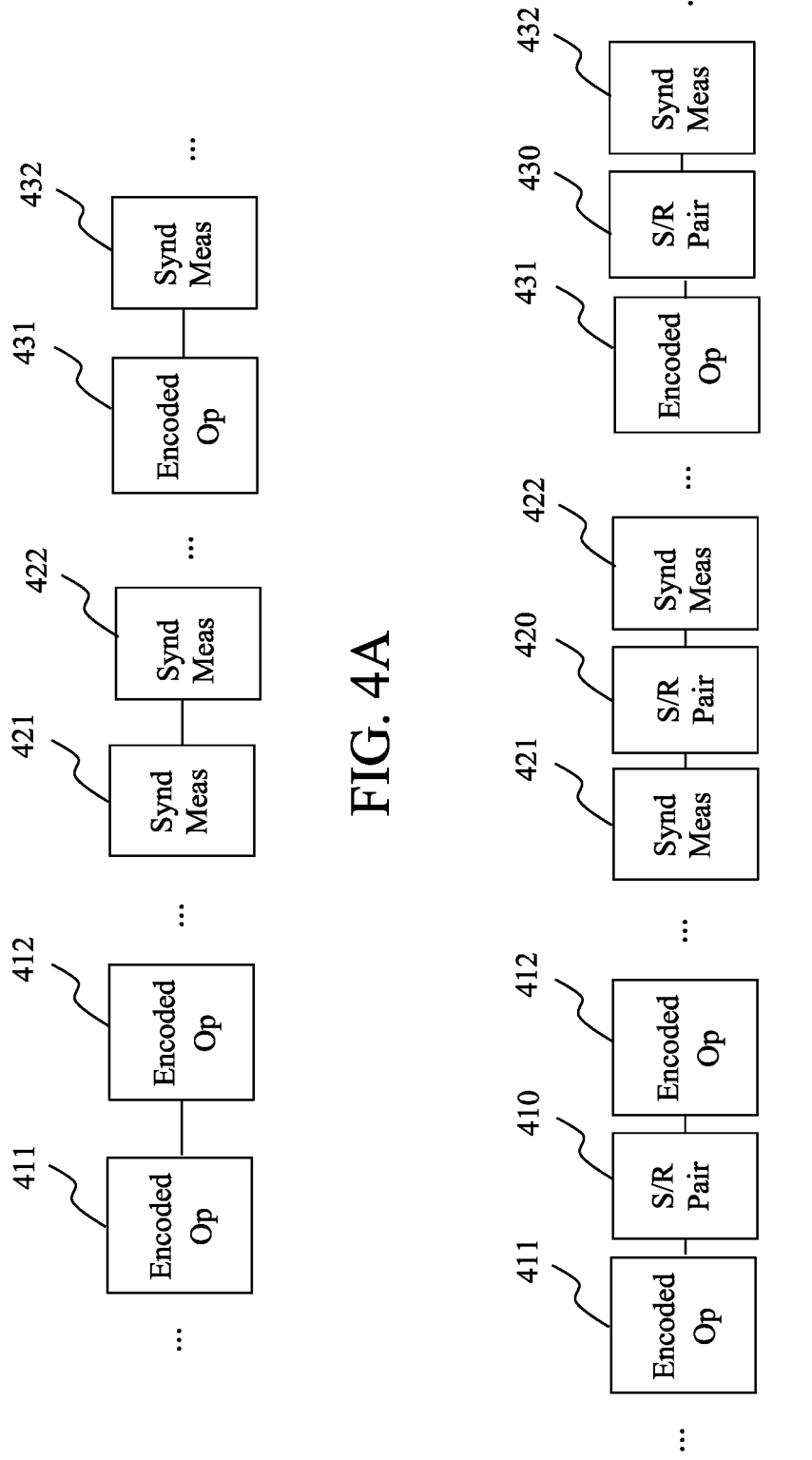
FIG. 4A is a simplified block diagram showing an example of a bare quantum-logic circuit including encoded operations and syndrome measurements.
FIG. 4B is a simplified block diagram showing an example of interleaving random stabilizers paired with random operations between adjacent encoded operations, between adjacent syndrome measurements, and/or between adjacent encoded operations and syndrome measurements, respectively, according to a representative embodiment.

FIG. 4A is a simplified block diagram showing an example of a bare quantum-logic circuit including encoded operations and syndrome measurements, and FIG. 4B is a simplified block diagram showing an example of interleaving random stabilizers paired with random operations between adjacent encoded operations, between adjacent syndrome measurements, and/or between adjacent encoded operations and syndrome measurements, respectively, according to a representative embodiment. As stated above, the term "interleaving" is used to indicate that the random stabilizer/random operation pairs are provided between adjacent encoded operations and/or syndrome measurements, examples of which are shown in FIGS. 3A to 3D.

Referring to FIG. 4A, the illustrative bare quantum-logic circuit shows encoded operation 411, encoded operation 412, syndrome measurement 421, syndrome measurement 422, encoded operation 431 and syndrome measurement 432 before compilation. Referring to FIG. 4B, further to the compilation process, representative random stabilizer/random (S/R) operation pair 410 is interleaved between adjacent encoded operations 411 and 412, where each encoded operation may be an encoded state reset, an encoded unitary operation, or an encoded measurement, as discussed above. Also, representative random stabilizer/random operation pair 420 is interleaved between adjacent syndrome measurements 421 and 422, and representative random stabilizer/random operation pair 430 is interleaved between adjacent encoded operation 431 and syndrome measurement 432. Of course, FIGS. 4A and 4B are provided for purposes of illustration, and any combinations of encoded operations and syndrome measurements, and interleaving between them, are contemplated without departing from the scope of the present teachings.

Referring again to FIG. 2, in block S213, the random stabilizers and/or the additional random operations are (optionally) reduced and/or compiled into adjacent operations and/or implemented virtually wherever possible. That is, the random stabilizers and/or random stabilizers paired with random operations introduced according to the various embodiments herein may be compiled into additional adjacent operations. Since the additional adjacent operations are typically transversal single-qudit operations at the logical level, very few additional physical operations are introduced. Virtual implementation of a given operation may include virtually changing subsequent operations instead of acting on the qudits in the quantum information processor 125 of the given operation. Although an entire circuit cannot be implemented virtually, virtual implementation can be used to reduce noise introduced by gates by reducing the number of gates being implemented on the hardware.

Protocols for mitigating or suppressing noise at the physical level may still be used for some parts of the implementation. For example, physical RC and measurement mitigation may be applied to the circuit implementations of encoded operations. Generally, physical RC and measurement mitigation further reduce the effects of noise. Physical RC, for example, is useful as part of syndrome extraction when a unitary operation (e.g., unitary operation (U) 342) is noisy. This is because multiple gates are often applied at the physical level to implement an encoded unitary operation, and it may desirable to mitigate the noise introduced by these gates. Measurement mitigation offsets the impact of physical measurement errors to mitigate noise (e.g., bit flips) in the error syndromes, for example.

In block S214, the one or more modified quantum-logic circuits are output as a result of the compilation of the bare quantum-logic circuit. In an embodiment, the one or more modified quantum-logic circuits may be provided to a quantum information processor (e.g., quantum information processor 125) to be executed in place of the corresponding bare quantum-logic circuit, resulting in a noise-tailored outcome with reduced coherent and non-unital logical noise. That is, the coherent and non-unital logical noise is tailored to appear closer to stochastic Weyl logical noise. In an alternative embodiment, the one or more modified quantum-logic circuits are provided to a simulator configured to simulate functionality of a quantum information processor, as discussed above. The simulator likewise executes the one or more modified quantum-logic circuits in place of the corresponding bare quantum-logic circuit, resulting in a noise-tailored outcome with reduced coherent and non-unital logical noise. Also, outputting the one or more modified quantum-logic circuits to the quantum information processor or the simulator of the quantum information processor for execution may include converting the one or more modified quantum-logic circuits to machine code that is compatible with the quantum information processor or the simulator of the quantum information processor, as would be apparent to one skilled in the art. In an embodiment, when more than one modified quantum-logic circuit is output, multiple outcomes from the compiler may be averaged in order to obtain the noise-tailored outcome.

The foregoing embodiments improve the functioning of a computer, e.g., the quantum information processor and/or the simulator simulating functionality of the quantum information processor, and otherwise improve technology with regard to quantum computing. By tailoring coherent and non-unital logical noise to appear closer to stochastic Weyl logical noise, the compiling process enables more efficient and accurate operation of the quantum information processor and/or the simulator. Noise that is easier to handle or has lower impact means less overhead is needed for effective error correction. For example, fewer qudits are needed and algorithms are decoded faster.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method of compiling a bare quantum-logic circuit, the method comprising:

receiving a bare quantum-logic circuit comprising a plurality of encoded operations and a plurality of syndrome measurements, wherein each encoded operation and each syndrome measurement is associated with an input quantum error correcting code (QECC) and/or an output QECC;

interleaving a plurality of random stabilizers respectively paired with a plurality of random operations between adjacent encoded operations, between adjacent syndrome measurements, and/or between adjacent encoded operations and syndrome measurements, respectively, to provide one or more modified quantum-logic circuits that are logically equivalent to the bare quantum-logic circuit; and outputting the one or more modified quantum-logic circuits to a quantum information processor or a simulator of a quantum information processor for execution, wherein when executed, the one or more modified quantum-logic circuits result in a noise-tailored outcome, having reduced coherent and non-unital logical noise.

2. The method of claim 1, wherein a portion of the plurality of random operations are configured to invert one or more random operations interleaved between other encoded operations and/or syndrome measurements.

3. The method of claim 1, wherein the plurality of encoded operations comprise corresponding encoded state resets, encoded unitary operations, and/or encoded measurements of logical operations.

4. The method of claim 3, wherein for at least one of the encoded state resets, interleaving the plurality of random stabilizers comprises applying a random stabilizer after the encoded state reset, wherein the random stabilizer is drawn from a stabilizer group of the output QECC associated with the encoded state reset.

5. The method of claim 3, wherein for at least one of the encoded unitary operations, interleaving the plurality of random stabilizers comprises:

applying a first random stabilizer paired with a first random operation, providing an interim operation, before the encoded unitary operation, wherein the first random stabilizer is drawn from a stabilizer group of the input QECC associated with the encoded unitary operation; and/or applying a second random stabilizer paired with the interim operation after the encoded unitary operation, wherein the second random stabilizer is drawn from the stabilizer group of the output QECC associated with the encoded unitary operation.

6. The method of claim 3, wherein for at least one of the encoded measurements, interleaving the plurality of random stabilizers comprises applying a random stabilizer paired with a random operation before the encoded measurement, wherein the random stabilizer is drawn from a stabilizer group of the input QECC associated with the encoded measurement.

7. The method of claim 1, wherein for at least one syndrome measurement of the plurality of syndrome measurements, interleaving the plurality of random stabilizers comprises:

applying a random stabilizer drawn from a stabilizer group of the input QECC associated with the at least one syndrome measurement before measuring at least one dit of the at least one syndrome measurement, and/or applying another random stabilizer drawn from the stabilizer group of the output QECC associated with the at least one syndrome measurement after measuring at least one dit.

8. A system, comprising:

a quantum information processor; and one or more data processors configured to perform operations comprising:

receiving a bare quantum-logic circuit comprising a plurality of encoded operations and a plurality of syndrome measurements, wherein each encoded operation and each syndrome measurement may be associated with an input quantum error correcting code (QECC) and/or an output QECC;

interleaving a plurality of random stabilizers respectively paired with a plurality of random operations between adjacent encoded operations, between adjacent syndrome measurements, and/or between adjacent encoded operations and syndrome measurements, respectively, to provide one or more modified quantum-logic circuits that are logically equivalent to the bare quantum-logic circuit; and output the one or more modified quantum-logic circuits, wherein the quantum information processor is configured to receive and execute the one or more modified quantum-logic circuits output by the one or more data processors to obtain a noise-tailored outcome having reduced coherent and non-unital logical noise.

9. The system of claim 8, wherein a portion of the plurality of random operations are configured to invert one or more random operations interleaved between other encoded operations and/or syndrome measurements.

10. The system of claim 8, wherein the one or more data processors output the one or more modified quantum-logic circuits by converting the one or more modified quantum-logic circuits to machine code that is compatible with the quantum information processor or a simulator of the quantum information processor.

11. The system of claim 8, wherein the plurality of encoded operations comprise corresponding encoded state resets, encoded unitary operations, and/or encoded measurements of logical operations.

12. The system of claim 11, wherein for at least one of the encoded state resets, the one or more data processors interleave random stabilizers by applying a random stabilizer after the encoded state reset, wherein the random stabilizer is drawn from a stabilizer group of the output QECC associated with the encoded state reset.

13. The system of claim 11, wherein for at least one of the encoded unitary operations, the one or more data processors apply the plurality of random stabilizers by:

applying a first random stabilizer paired with a first random operation, providing an interim operation, before the encoded unitary operation, wherein the first random stabilizer is drawn from a stabilizer group of the input QECC associated with the encoded unitary operation; and/or applying a second random stabilizer paired with the interim operation after the encoded unitary operation, wherein the second random stabilizer is drawn from the stabilizer group of the output QECC associated with the encoded unitary operation.

14. The system of claim 11, wherein for at least one of the encoded measurements, the one or more data processors interleave random stabilizers and operations by applying a random stabilizer paired with a random operation before the encoded measurement, wherein the random stabilizer is drawn from a stabilizer group of the input QECC associated with the encoded measurement.

15. The system of claim 8, wherein for at least one syndrome measurement of the plurality of syndrome measurements, the one or more data processors interleave random stabilizers by:

applying a random stabilizer drawn from a stabilizer group of the input QECC associated with the at least one syndrome measurement before measuring at least one dit during the at least one syndrome measurement, and/or applying another random stabilizer drawn from the stabilizer group of the output QECC associated with the at least one syndrome measurement after measuring at least one dit during the at least one syndrome measurement.

16. The system of claim 8, wherein the plurality of random stabilizers and additional random operations are reduced and compiled into adjacent operations or implemented virtually when possible.

17. The system of claim 8, wherein at least one random operation of the plurality of random operations is drawn from a trivial group, such that no logical operation is applied, and wherein interleaving at least one random stabilizer of the plurality of random stabilizers associated with the at least one random operation drawn from the trivial group is functionally equivalent to interleaving the at least one random stabilizer by itself.

18. A method of tailoring noise in quantum computations, the method comprising:

receiving a bare quantum-logic circuit comprising a plurality of encoded operations and a plurality of syndrome measurements, wherein the plurality of encoded operations comprise corresponding encoded state resets, encoded unitary operations, and/or encoded measurements of logical operations, and wherein each encoded operation and each syndrome measurement may be associated with an input quantum error correcting code (QECC) and/or an output QECC;

generating, by operation of a data processor, one or more modified quantum-logic circuits that are logically equivalent to the bare quantum-logic circuit, wherein generating the one or more modified quantum-logic circuits comprises interleaving a plurality of random stabilizers paired with a plurality of random operations between adjacent encoded operations of the plurality of encoded operations, between adjacent syndrome measurements of the plurality of syndrome measurements, and/or between adjacent encoded operations and syndrome measurements, respectively;

executing the one or more modified quantum-logic circuits on a quantum information processor or a simulator of a quantum information processor to obtain a plurality of outcomes; and averaging the outcomes to obtain a noise-tailored outcome, wherein:

for at least one of the encoded state resets, interleaving the plurality of random stabilizers comprises applying a random stabilizer after the encoded state reset;

for at least one of the encoded unitary operations, interleaving the plurality of random stabilizers comprises applying a first random stabilizer paired with a first random operation, providing an interim operation, before the encoded unitary operation, and applying a second random stabilizer paired with the interim operation after the encoded unitary operation; and for at least one of the encoded measurements, interleaving the plurality of random stabilizers comprises applying a random stabilizer paired with a random operation before the encoded measurement.

19. The method of claim 18, wherein all random stabilizers are drawn from a stabilizer group of the input QECC associated with a following encoded operation or stabilizer measurement and/or from a stabilizer group of the output QECC associated with a preceding encoded operation or stabilizer measurement.

20. The method of claim 18, wherein for at least one syndrome measurement of the plurality of syndrome measurements, interleaving the plurality of random stabilizers comprises:

applying a random stabilizer drawn from a stabilizer group of the input QECC associated with the at least one syndrome measurement before measuring at least one dit of the at least one syndrome measurement, and/or applying another random stabilizer drawn from the stabilizer group of the output QECC associated with the at least one syndrome measurement after measuring at least one dit.

* * * * *